United States Patent
Harig et al.

(10) Patent No.: US 11,994,430 B2
(45) Date of Patent: May 28, 2024

(54) METHOD FOR DETERMINING A CORRECTION VALUE FUNCTION AND METHOD FOR GENERATING A FREQUENCY-CORRECTED HYPERSPECTRAL IMAGE

(71) Applicant: Bruker Optik GmbH, Ettlingen (DE)

(72) Inventors: Roland Harig, Waldbronn (DE); Stephan Luettjohann, Karlsruhe (DE)

(73) Assignee: BRUKER OPTICS GMBH & CO. KG, Ettlingen (DE)

( * ) Notice: Subject to any disclaimer, the term of this patent is extended or adjusted under 35 U.S.C. 154(b) by 335 days.

(21) Appl. No.: 17/474,431

(22) Filed: Sep. 14, 2021

(65) Prior Publication Data

US 2021/0404879 A1 Dec. 30, 2021

Related U.S. Application Data

(63) Continuation of application No. PCT/EP2020/055652, filed on Mar. 4, 2020.

(30) Foreign Application Priority Data

Mar. 15, 2019 (DE) ..................... 10 2019 203 562.0

(51) Int. Cl.
| | | |
|---|---|---|
| G01J 5/10 | (2006.01) | |
| G01J 5/00 | (2022.01) | |
| G01J 5/80 | (2022.01) | |

(52) U.S. Cl.
CPC ......... *G01J 5/10* (2013.01); *G01J 2005/0077* (2013.01); *G01J 5/80* (2022.01)

(58) Field of Classification Search
None
See application file for complete search history.

(56) References Cited

U.S. PATENT DOCUMENTS

| | | |
|---|---|---|
| 5,790,250 A | 8/1998 | Wang et al. |
| 5,933,792 A | 8/1999 | Andersen et al. |

(Continued)

FOREIGN PATENT DOCUMENTS

| | | |
|---|---|---|
| CN | 101084419 A | 12/2007 |
| CN | 103323114 A | 9/2013 |

(Continued)

OTHER PUBLICATIONS

Lowenstein, E.V., "Fourier Spectroscopy—An Introduction", Aspen International Conference on Fourier Spectroscopy, 1970, Jan. 1971, Special Reports, No. 114, 28 pages.

(Continued)

*Primary Examiner* — Lina Cordero
(74) *Attorney, Agent, or Firm* — Edell, Shapiro & Finnan, LLC

(57) ABSTRACT

A method for determining a correcting quantity function $k_F(x, y)$ for calibrating an FTIR measurement arrangement with an IR detector. The IR detector includes a plurality of sensor elements, which are each located at a position (x, y), and the method includes: (a) recording interferograms $IFG_{R_{xy}}$ of a reference sample using the sensor elements of the IR detector, (b) calculating spectra $R_{xy}$ of the reference sample by Fourier transforming the interferograms of the reference sample for at least four sensor elements, (c) calculating correcting quantities $k_{xy}$ by comparing each spectrum $R_{xy}$ of the reference sample calculated in step b) with a reference data set of the reference sample, and (d) determining the correcting quantity function $k_F(x, y)$ using the correcting quantities $k_{xy}$ calculated in step c). This permits frequency shifts that occur in FTIR spectrometers with extensive detectors to be effectively corrected regardless of the position of the sensor element.

18 Claims, 11 Drawing Sheets

(56) References Cited

U.S. PATENT DOCUMENTS

| | | | |
|---|---|---|---|
| 6,260,997 B1 * | 7/2001 | Claybourn | G01Q 30/02 |
| | | | 374/45 |
| 7,411,682 B2 | 9/2008 | Moshe | |
| 9,846,078 B2 * | 12/2017 | Juhl | G01J 3/45 |
| 10,317,283 B2 | 6/2019 | Sunami et al. | |
| 2008/0252897 A1 | 10/2008 | Arnvidarson et al. | |
| 2008/0290279 A1 | 11/2008 | Juhl | |
| 2011/0235034 A1 * | 9/2011 | Fukuda | G01J 3/45 |
| | | | 356/319 |
| 2014/0022546 A1 * | 1/2014 | Nagai | G01J 3/0208 |
| | | | 356/326 |
| 2018/0328788 A1 | 11/2018 | Andersen et al. | |

FOREIGN PATENT DOCUMENTS

| | | |
|---|---|---|
| CN | 104729712 A | 6/2015 |
| CN | 107290057 A | 10/2017 |
| EP | 2221577 B1 | 8/2010 |
| WO | 2017135356 A1 | 8/2017 |

OTHER PUBLICATIONS

Griffiths et al., "Fourier Transform Infrared Spectrometry", vol. 83 Chemical Analysis; pp. 32-39.

Bell, "Introductory Fourier Transform Specroscopy", Academic Press, 1972, Chapter 11, 8 pages.

Kretschmer, "Modelling of the Instrument Spectral Response of Conventional and Imaging Fourier Transform Spectrometers", 2014, 255 pages.

Farley et al., "Radiometric calibration stability of the FIRST: A longwave infrared hyperspectral imaging sensor", SPIE, vol. 6206, 2006, 12 pages.

Herres et al., "Understanding FT-IR Data Processing", (2015), 23 pages.

* cited by examiner

METHOD FOR DETERMINING A CORRECTION VALUE FUNCTION AND METHOD FOR GENERATING A FREQUENCY-CORRECTED HYPERSPECTRAL IMAGE

CROSS REFERENCE TO RELATED APPLICATIONS

This is a Continuation of International Application PCT/EP2020/055652, which has an international filing date of Mar. 4, 2020, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2019 203 562.0 filed on Mar. 15, 2019.

FIELD OF THE INVENTION

The invention relates to a method for determining a correcting quantity function for calibrating a Fourier Transform Infrared (FTIR) measurement arrangement with an infrared (IR) detector. The FTIR measurement arrangement moreover comprises an IR source, an interferometer and a sample position, with the light of the IR source being steered through the interferometer and, following the emergence from the interferometer, to the sample position which is situated at the focus of an imaging optical system. The sample position is imaged onto the detector.

The invention also relates to a method for generating a frequency-corrected hyperspectral image of a sample utilizing an FTIR measurement arrangement with an IR detector.

A method for determining a correcting quantity for calibrating an FTIR spectrometer is known from [3].

Imaging FTIR microscopes allow spatially resolved spectral measurements of microscopic samples, with infrared spectra being recorded simultaneously at different positions on the sample. A hyperspectral image of the sample arises. To this end, the IR light passes through an interferometer in which a movement of one or more mirrors leads to a variation in the length of the interferometer arms with respect to one another and thus to a modulation of the infrared light depending on its wavelength. Here, the modulation frequency depends on the wavelength, with each wavelength being able to be uniquely assigned a modulation frequency. The infrared light modulated thus is guided to a sample to be examined and the light emanating from the sample is focused on an infrared detector.

BACKGROUND

The infrared detector records the signal I(Δx) to be measured as a function of the path difference Δx between the two interferometer arms, leading to the creation of the interferogram from which the infrared spectrum can be calculated by way of a Fourier transform. Determining the relative position Δx of the interferometer mirrors with respect to one another is usually implemented by virtue of the light of a laser being sent through the interferometer in addition to the infrared light and the resultant signal of the laser light being recorded by a distinct laser detector. The relative mirror positions with respect to one another can be determined very accurately by way of the zeros of the AC-coupled laser interferogram $I_{LAS}$ and the laser wavelength $\lambda_{LAS}$ [1, 3].

If the infrared detector consists of a plurality of sensitive elements (sensor elements) which are arranged in a row or in an array, then a plurality of regions of the sample can be examined simultaneously in spatially resolved fashion. Each sensor element of the detector can record an interferogram, from which it is then possible to calculate an infrared spectrum.

The microscope optics can be characterized by an effective focal length $f_{\it eff}$. This effective focal length and the extent of the area detector ensure that the different sensor elements (pixels) of the infrared detector register light at different angles from the interferometer.

It is known that beams that run through the interferometer in a manner non-parallel to the optical axis experience a smaller optical path difference between the two interferometer arms than beams that extend parallel to the optical axis [1], [2]. As a consequence, the interferogram for radiation running through the interferometer in a manner non-parallel to the optical axis is stretched in relation to an interferogram in which the radiation runs through the interferometer in a manner parallel to the optical axis and wavelengths consequently experience a lower modulation frequency and the resultant spectrum as a function of frequency is therefore compressed. Hence, absorption bands appear shifted to smaller wavenumbers (frequencies).

Since each sensor element (pixel) of the detector records radiation with a different angle, the spectra are compressed to a different extent depending on the position of the sensor element on the detector and absorption bands have differently pronounced shifts.

A shift of the absorption bands may even occur in the case of FTIR spectrometers with single element detectors, for example if the setup is such that the detector is predominantly reached by radiation that runs through the interferometer at a slight angle or that is inclined in relation to the axis of the reference laser. From [3], it is known to correct the shift arising as a result by virtue of the value of the laser wavenumber $v_{LAS}$ simply being altered by a suitable amount in order to correct the frequency axis in the spectrum. Of course, the laser wavenumber (or laser wavelength) determines the frequency grid which arises for the spectrum following the Fourier transform.

To shift the band position at least approximately into the correct region in the case of an FTIR spectrometer with an area detector, the use of a constant compression factor, which is the same for all sensor elements, is known. The method corresponds to the method according to [3] for single element detectors just described and therefore there is a good correction for only one pixel. However, this does not allow an accurate correction for all sensor elements.

SUMMARY

It is an object of the invention to propose a method for determining a correcting quantity function, with which the frequency shifts that occur with respect to FTIR spectrometers with extensive detectors can be effectively corrected independently of the position of the detecting sensor element. It is a further object to propose a method for generating a frequency-corrected hyperspectral image.

According to various formulations of the invention, these objects are addressed by a method for determining a correcting quantity function as claimed herein and by a method for generating a frequency-corrected hyperspectral image as claimed herein.

An IR detector with a plurality of sensor elements which are each situated at a position (x,y) is used in the methods according to the invention.

The method according to the invention for determining a correcting quantity function comprises the following steps:
a) recording interferograms $IFG_{Rxy}$ of a reference sample using the sensor elements of the IR detector;
b) calculating spectra $R_{xy}$ of the reference sample by Fourier transforming the interferograms $IFG_{Rxy}$ of the reference sample for at least four sensor elements;
c) calculating correcting quantities $k_{xy}$ by comparing each spectrum $R_{xy}$ of the reference sample calculated in b) with a reference data set of the reference sample;
d) determining the correcting quantity function $k_F(x, y)$ using the correcting quantities $k_{xy}$ calculated in c).

According to the invention, the spectra of the individual sensor elements are therefore evaluated on an individual basis and the correction in relation to the reference data set (e.g., the band position of an absorption peak tabulated in the literature) is calculated. The correcting quantity function $k_F(x, y)$ comprises the totality of the calculated correcting quantities $k_{xy}$. As a result, it is possible to consider the circumstances (in particular the position) of each pixel and an optimal correction is realized for each pixel.

In a first variant of the method according to the invention for determining the correcting quantity function, the reference data set comprises a target position $v_L$ of a selected absorption peak P of the reference sample. The calculation of the correcting quantities $k_{xy}$ in step c) is implemented by a comparison with actual positions $v_{xy}$ of the absorption peak P in the spectra $R_{xy}$ of the reference sample. By way of example, the position of the absorption peak in the spectra can be determined by finding the absolute maximum, by means of a center-of-gravity statistic, by means of an evaluation or by means of a fit to a Gaussian peak.

In this first variant, the correcting quantities $k_{xy}$ can be determined by subtracting the target position $v_L$ from the actual position $v_{xy}$ or dividing the latter by the former, with the following applying:

$$k_{xy}=v_{xy}-v_L \text{ or } k_{xy}=v_{xy}/v_L$$

In a second variant of the method according to the invention for determining the correcting quantity function, the reference data set comprises a simulated spectrum $S_{sim}$ with a plurality of absorption peaks of the reference sample. The calculation of the correcting quantities $k_{xy}$ in step c) is implemented by comparing the spectra $R_{xy}$ of the reference sample calculated in b) with the simulated spectrum $S_{sim}$. This method variant allows a plurality of characteristic absorption bands to be included simultaneously in the evaluation.

In this second method variant, the correcting quantities $k_{xy}$ are preferably determined by maximizing the correlation, by varying $k_{xy}$, between the simulated spectrum $S_{sim}(v)$ and the spectrum $R_{xy}(v-k_{xy})$ shifted by $k_{xy}$ or between the simulated spectrum $S_{sim}(v)$ and the spectrum $R_{xy}(v/k_{xy})$ stretched or compressed by $1/k_{xy}$. The measured spectra are iteratively stretched along the frequency axis until the correlation with the simulated spectrum is at a maximum.

To minimize the noise in the correcting quantity function, it is advantageous to use an analytical model to set up a system of equations for calculating the correcting quantity function $k_F(x,y)$.

By way of example, the correcting quantity function $k_F(x,y)$ can be given by $$k_F(x, y) = k_c \cos\left(\arctan\left(\frac{\sqrt{(c_y - y)^2 + (c_x - x)^2}}{f_{\mathit{eff}}}\right)\right)$$

where $c_y$, $c_x$, $f_{\mathit{eff}}$ and $k_c$ are parameters for matching the correcting quantity function $k_F(x,y)$ to the calculated correcting quantities $k_{xy}$.

As an alternative thereto, the correcting quantity function $k_F(x,y)$ can be given by $$k_F(x,y)=a*(x^2+y^2)+b*x+c*y+d$$

where a, b, c and d are parameters for matching the correcting quantity function $k_F(x,y)$ to the calculated correcting quantities $k_{xy}$.

Preferably, matching the correcting quantity function $k_F(x,y)$ as per the analytical model to the correcting quantities $k_{xy}$ calculated in c) is implemented for both analytical models by minimizing the error function $$\Sigma_{xy}(k_F(x,y)-k_{xy})^2.$$

Preferably, the parameters required for the analytical model are determined by setting up equations with the correcting quantities $k_{xy}$ determined in step c) for at least four sensor elements and by solving the system of equations arising therefrom through curve fitting. Consequently, the systems of equations with four unknowns, which arise from the aforementioned analytical models, can be solved. Preferably, step c) is carried out for sensor elements which are partly arranged at the edge of the IR detector and partly arranged in the vicinity of the center of the IR detector. In particular, step c) can be carried out for all sensor elements.

The invention also relates to a method for generating a frequency-corrected hyperspectral image of a sample with an FTIR measurement arrangement with an IR detector comprising a plurality of sensor elements, with the method comprising the following for each sensor element with a position (x,y) of the IR detector:
recording an interferogram $IFG_{Pxy}$ with an equidistant sampling grid $a_{xy}$ with the sensor element;
Fourier transforming the interferogram for determining a spectrum $S_{xy}(v)$ with a frequency axis.

According to the invention, the spectrum $S_{xy}(v)$ of each sensor element is corrected with the correcting quantity function $k_F(x,y)$ determined as described above.

The sensor element-specific correcting quantities are determined in device-specific fashion. Thus, separate correcting quantity determinations are carried out for different FTIR measurement arrangements of the same type. Preferably, the sensor element-specific correcting quantities are determined daily to monthly for each FTIR measurement arrangement and/or after changes were carried out on the device, in particular if the setup was altered.

There are various options for carrying out the correction of the spectra $S_{xy}(v)$, firstly in view of the ascertainment of the correcting quantity function and secondly in view of the time of the correction within the recording procedure for the hyperspectral image:

One variant I of the method according to the invention for generating a frequency-corrected hyperspectral image provides for the correcting quantity function $k_F(x,y)$ to have been determined by stretching or compressing the spectra $R_{xy}$ of the reference sample calculated in step b) (determination of the correcting quantity function using a selected region of a spectrum) or by dividing the target position $v_L$ and the actual position $v_y$ of the selected absorption peak P of the reference sample (determination of the correcting quantity function using a selected absorption peak), and for each spectral point $(v_n, I_n)$ of the spectrum $S_{xy}(v)$ of the sample to be corrected to $(v_n/k_F(x,y), I_n)$, where $I_n$ denotes the intensity of the n-th spectral point in the spectrum $S_{xy}(v)$ of the sample.

In a variant II of the method according to the invention for generating a frequency-corrected hyperspectral image, the correcting quantity function $k_F(x,y)$ is determined by shifting the spectra $R_{xy}$ of the reference sample calculated in b) (determination of the correcting quantity function using a selected region of a spectrum) or by subtracting the target position $v_L$ and the actual position $v_{xy}$ (determination of the correcting quantity function using a selected absorption peak), and each spectral point $(v_n, I_n)$ of the spectrum $S_{xy}(v)$ of the sample is corrected to $(v_n-k_F(x,y), I_n)$.

While the correction is undertaken after the Fourier transform in the first two variants, the correction is implemented before or during the Fourier transform in the third and fourth variants described below:

A variant III of the method according to the invention for generating a frequency-corrected hyperspectral image provides for the correcting quantity function $k_F(x,y)$ to have been determined by stretching or compressing the spectra $R_{xy}$ of the reference sample calculated in b) or by dividing the target position $v_L$ and the actual position $v_y$ of the selected absorption peak, and for the interferogram $IFG_{Pxy}$ to be recorded with a sampling grid (spacing between two sampling points in the interferogram) of $a_{xy}=a_0/k_F(x, y)$ and for the spectra $S_{xy}(v)$ of the sample to be subsequently generated by a Fourier transform of the corrected interferograms, where $a_0$ is used as value for the sampling grid when calculating the values for the frequency axis. Thus, the correction can be implemented when recording the measurement data by adjusting the sampling grid $a_{xy}$ with which the measurement data are recorded or be implemented by interpolation from interferograms recorded with a fixed sampling frequency to the required (pixel-dependent) sampling points. The sampling grid $a_0$ is then increased to a value $a_0/k_F(x,y)$ in sensor element-specific fashion. However, the value $a_0$ is used for all sensor elements in the calculation when determining the frequency axis.

A variant IV of the method according to the invention for generating a frequency-corrected hyperspectral image provides for the correcting quantity function $k_F(x,y)$ to have been determined by stretching or compressing the spectra $R_{xy}$ of the reference sample calculated in b) or by dividing the target position $v_L$ and the actual position $v_{xy}$ of the selected absorption peak. The interferogram $IFG_{Pxy}$ is recorded with a sampling grid of $a_{xy}=a_0$ and the spectra $S_{xy}(v)$ of the sample are subsequently generated by a Fourier transform of the interferograms, where $a_0*k_F(x,y)$ is used as value for the sampling grid $a_{xy}$ when calculating the values for the frequency axis. Thus, the correction is implemented after recording the measurement data by adjusting the values of the sampling grid of the interferogram when calculating the values for the frequency axis. The interferograms of sensor elements with $k_{xy}<1$ are stretched in the real domain; i.e., they are sampled at a higher frequency by a pixel-independent sampling grid $a_0$ than interferograms of pixels on the optical axis ($k_{xy}=1$). In order to obtain the same spectral resolution, it may be necessary to record more interferogram points so that the overall length of the interferogram is maintained.

The correction by way of the interferograms (variants III and IV) only works if the correcting quantity function $k_F(x,y)$ was defined by way of compression/stretching, i.e., if the correcting quantity $k_F(x,y)$ is dimensionless. If the correcting quantity $k_F(x,y)$ is defined by way of a difference, no correction by way of the interferograms can be ascertained using this correcting variable $k_F(x,y)$.

Preferably, the FTIR measurement arrangement is an IR microscope. To determine the hyperspectral image of the sample region, modulated IR radiation is generated with an interferometer, the sample is illuminated by the modulated radiation with microscope optics and the modulated radiation reflected or transmitted by the sample is detected with the detector.

Further advantages of the invention emerge from the description and the drawing. Likewise, according to the invention, the features specified above and the features explained in more detail can each find use individually on their own or together in any combination. The embodiments shown and described should not be construed to be a comprehensive list but instead are of exemplary nature for the purposes of explaining the invention.

DETAILED DESCRIPTION

Figure 1:
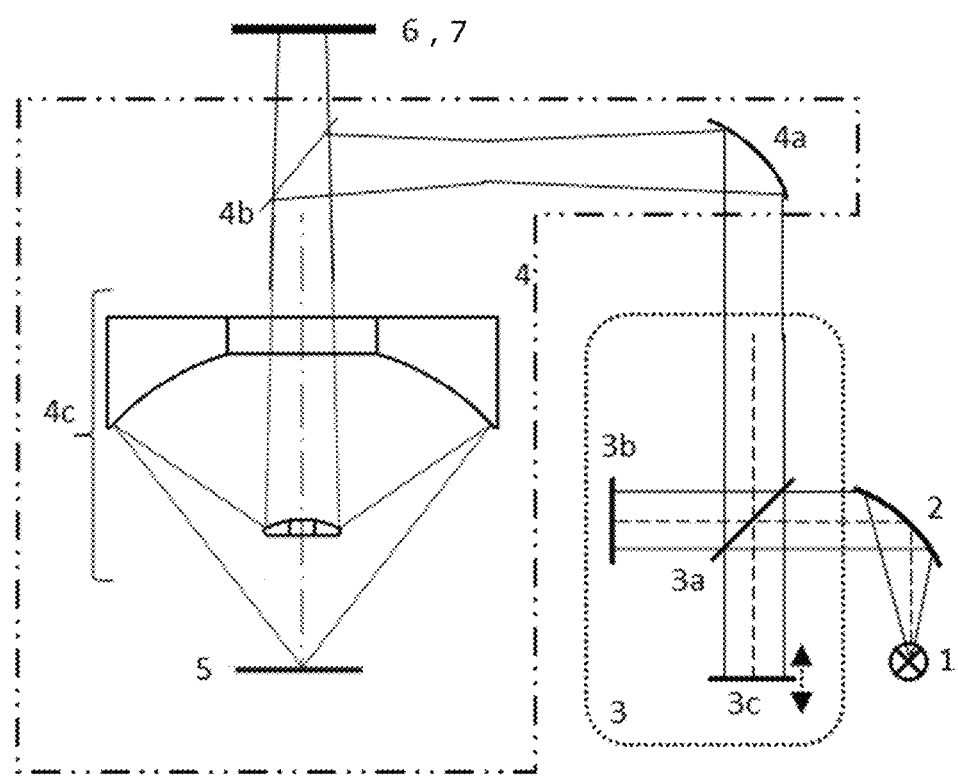
FIG. 1 shows the setup of an FTIR microscope for reflection-type FTIR measurements.

FIG. 1 shows an FTIR microscope in a reflection arrangement. The infrared light of an IR source 1 is collected by a mirror 2, collimated and steered into a (modified) Michelson interferometer 3. Here, the light strikes a beam splitter 3a, which transmits some of the radiation and passes the latter to a fixed mirror 3b and which reflects another part of the radiation and steers the latter to a movable mirror 3c. The light reflected at the mirrors 3b and 3c then is superimposed again at the beam splitter 3a and leaves the interferometer 3. The infrared light modulated by the interferometer 3 leaves the interferometer 3 and is guided into microscope optics 4. There, it is steered via various mirrors 4a to a beam splitter or half-mirror 4b, from where it is guided into an objective 4c (condenser), which illuminates the microscopic sample situated at the sample position 5. The sample at the sample position 5 interacts with the modulated infrared radiation and reflects some of the radiation. The reflected radiation is subsequently captured by the objective 4c and focused on the infrared detector 6. On its path to the infrared detector 6, the radiation passes the half-mirror or beam splitter 4b.

FTIR microscopy can also be implemented in transmission. A transmission FTIR microscope (not shown) comprises a further objective which is used to steer the light from the interferometer 3 onto the sample while the objective 4c is used to focus the light transmitted by the sample onto the infrared detector.

The objective 4c generates an image of the sample plane 5 on the sensor of the infrared detector 6. If the infrared detector consists of a plurality of sensitive elements which are arranged in a row or in an array, it is possible to simultaneously examine a plurality of regions of the sample with spatial resolution. Each element of the detector 6 can record an interferogram, from which it is then possible to calculate an infrared spectrum. Consequently, each pixel of the detector 6 registers a spatially resolved spectrum of the sample. In practice, such an area detector 6 can have various embodiments. In addition to detectors in which small detector elements are arranged in rows or in an array, use is also made of so-called focal plane arrays, in which the infrared-sensitive pixels are read in a manner similar to a CCD camera.

The microscope optics 4 firstly ensure that the collimated radiation from the interferometer 3 illuminates the sample and secondly ensure that, with the aid of the modulated radiation an image of the sample arises on the sensor elements of the detector.

Figure 2:
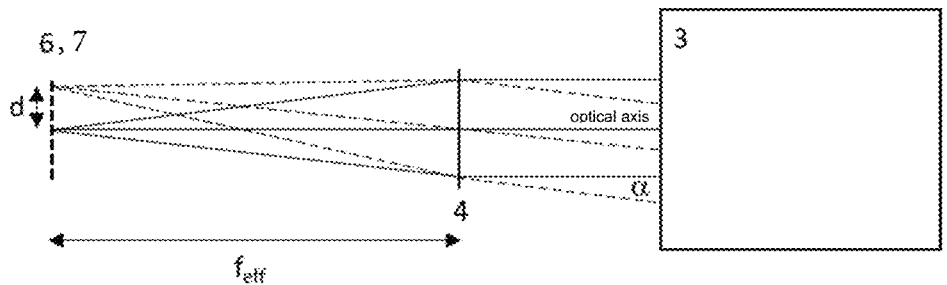
FIG. 2 shows the course of IR beams which emerge from the interferometer at different angles and strike an IR detector.

FIG. 2 schematically shows the microscope optics 4 with the effective focal length $f_{eff}$, which focus collimated radiation from the interferometer 3 on the area detector 6 with sensor elements 7. In this case, the central sensor element (on the optical axis) is reached by the radiation from the interferometer 3 which extends in collimated fashion and parallel to the optical axis. By contrast, sensor elements (pixels) which are at a distance d from the center of the area detector 6, through which the optical axis extends, see collimated radiation from the interferometer 3 which extends within the interferometer 3 with an inclination to the optical axis at an angle α. In this case, the following relationship applies:

$$\tan \alpha = d/f_{eff}.$$

Since every sensor element 7 (pixel) of the detector 6 records radiation at a different angle α, the spectra recorded by the various sensor elements are compressed to different extents depending on the position of the sensor element 7 on the detector 6; absorption bands in the spectra have differently pronounced shifts.

Figure 3:
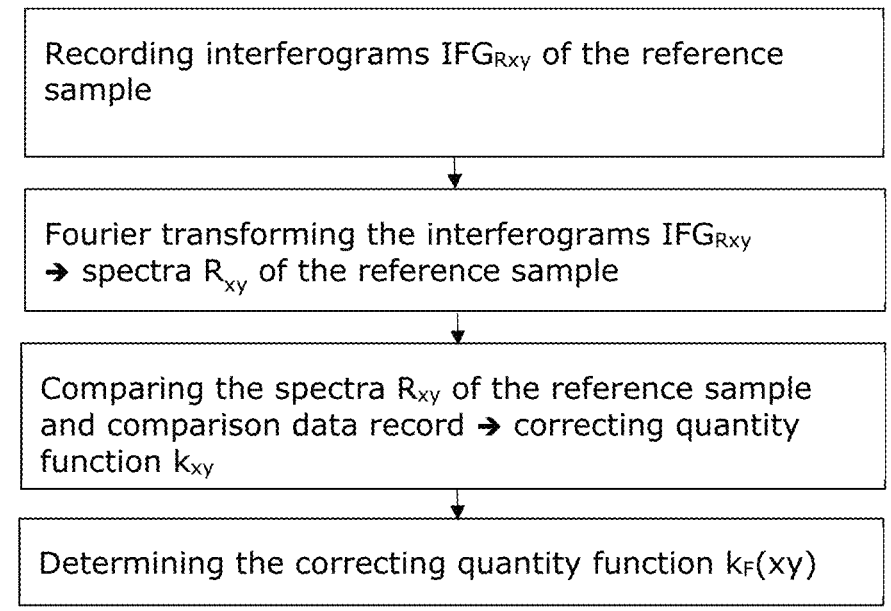
FIG. 3 shows the basic method steps of the method according to the invention for determining the correcting quantity function $k_{F(xy)}$.

According to the present invention, the spectra recorded by the various sensor elements 7 or parts of the spectra of a reference sample recorded by the various sensor elements 7 are evaluated on an individual basis for each sensor element and a separate correction is undertaken for each sensor element 7. The steps of the method according to the invention required to this end are illustrated in FIG. 3: initially, interferograms $IFG_{Rxy}$ are recorded for a reference sample (in this case: water vapor) with the sensor elements of the IR detector. Spectra $R_{xy}$ are calculated by Fourier transforming the interferograms. The spectra can be calculated for all sensor elements, but at least for four sensor elements. Correcting quantities $k_{xy}$ are determined by comparing the spectra $R_{xy}$ of the reference sample calculated in step b) with a reference data set of the reference sample. By way of example, the reference data set can be obtained from specialist literature or through a simulation. The calculated correcting quantities $k_{xy}$ are used to determine a correcting quantity function $k_F(x, y)$, which specifies the values of the correcting quantity $k_{xy}$ depending on the pixel position (x,y). There is no need to use the entire measured spectrum within the comparison according to the invention of the calculated spectra with the reference data set; instead, parts of the calculated spectra, for example a certain spectral range or else an individual absorption peak, can be used for the comparison. Two variants with which a corresponding correcting quantity function $k_F(x,y)$ can be determined are shown below.

Figure 4:
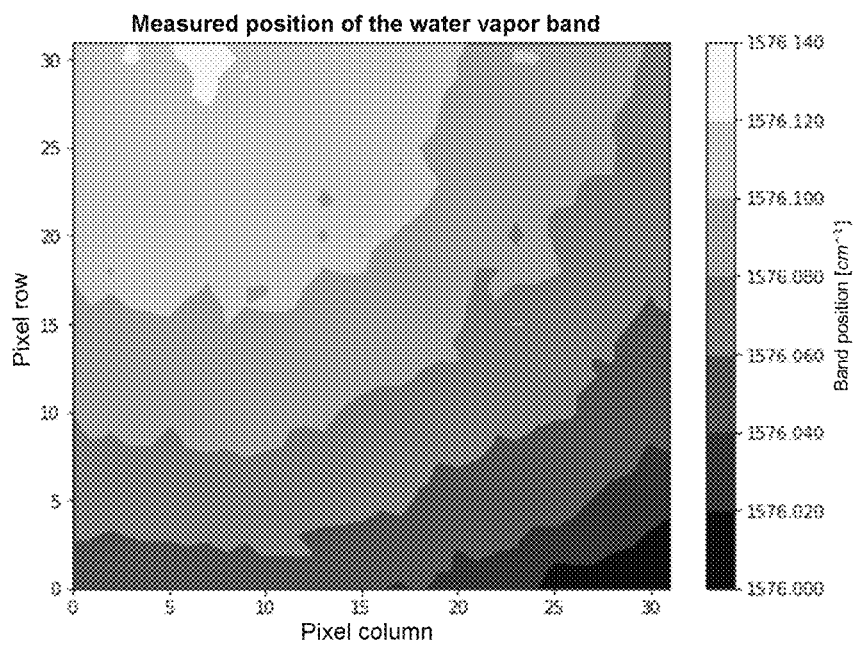
FIG. 4 shows, in spatially resolved fashion, the measured band position of an absorption peak of a reference sample selected by way of example, for the various sensor element positions (x,y) of the detector.

Variant 1: Determining the Correcting Quantity Function Using a Selected Absorption Peak FIG. 4 shows the result of a measurement of the relative position of a selected absorption peak (in this case: absorption band of water vapor with a target position at 1576.130 $cm^{-1}$) using an FTIR microscope, wherein use was made of a detector with a 32×32 pixel detector array (FPA). The relative position of the absorption band was evaluated for each spectrum and hence for each sensor element of the detector. FIG. 4 shows the position (actual position) of this water vapor band as grayscale values, encoded as a function of the detector row and the detector column. It is evident that the relative position of the selected band is at a maximum at approximately row 30 and column 7. From there, concentric rings are formed around this maximum with decreasing values of the band position (absorption peak is shifted to smaller wavenumbers). This is compatible with the theory since the angles α increase and the spectra are increasingly compressed with increasing distance of the pixels from the optical axis, which does not strike the sensor exactly in the center in this example.

The correcting quantities $k_{xy}$ for the respective sensor elements are calculated by virtue of a comparison value for the selected absorption peak, for example the target position of the selected absorption peak known from the literature, being compared (by subtraction or division) to the actual position of the corresponding absorption peak determined from the measured spectrum.

Figure 5:
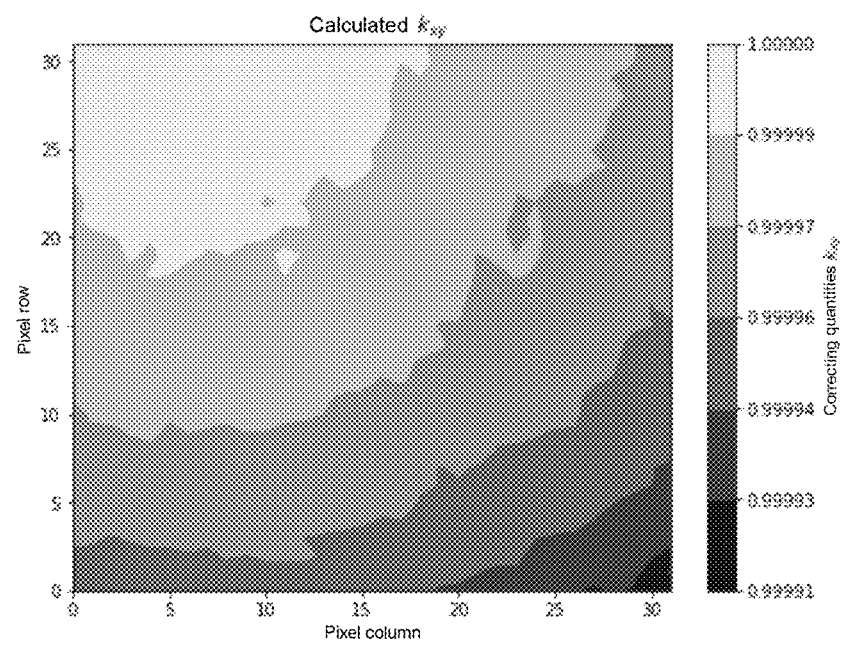
FIG. 5 shows, in spatially resolved fashion, the calculated correcting quantities $k_{xy}$ for the various sensor element positions (x,y) of the detector.

FIG. 5 illustrates the result of such a comparison (correcting quantities $k_{xy}$ as a function of the detector row and the detector column), in which the measured peak positions were divided by the comparison value $v_L$ ($k_{xy}=v_{xy}/v_L$).

Figure 9:
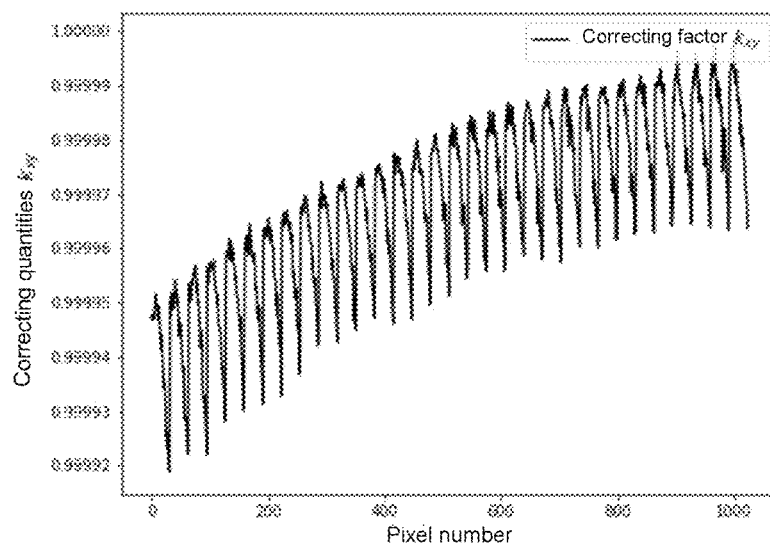
FIG. 9 shows the curve of the values of the correcting quantity $k_{xy}$ of FIG. 5 as a function of the pixel number of the IR detector.

In FIG. 9 the correcting quantity $k_{xy}$ is presented as a function of the pixel position/pixel number. It is evident that the correcting quantity $k_{xy}$ determined from the reference sample is noisy. This is due to the fact that the individual spectra from which the band positions of water vapor were determined also have a certain amount of noise. This noise influences the accuracy of the determination of the band position. Disadvantageously, the noise in the correcting quantity $k_{xy}$ is transferred to all subsequent measurements that are corrected with this correcting quantity $k_{xy}$. Better results can be obtained if further insight about the cause of the compression of the frequency axis is also included. This can be implemented by the use of an analytical model, as described below: it was already determined that radiation running at an angle α through the interferometer experiences smaller optical path length differences Δ between the two interferometer arms than radiation parallel to the optical axis:

$$\Delta = 2L \cos \alpha \quad (1)$$

As a result of the reduced modulation frequency by the interferometer, which has been reduced by a factor of cos α, the measured frequencies v' of the selected absorption peak likewise deviate from the true frequencies v by the factor cos α.

$$v' = v \cos \alpha \quad (2)$$

Each sensor element with the coordinates x and y on the detector 6 records radiation that runs through the interferometer at an angle α(x,y), with $$\tan \alpha(x,y) = \sqrt{(x-c_x)^2 + (y-c_y)^2}/f_{\text{eff}} \quad (3)$$

In this case, the optical axis intersects the sensor of the detector 6 at the coordinates ($c_x$, $c_y$).

If Equations 2 and 3 are combined, it is possible to describe the measured relative band position $v'=v_{xy}$ as a function of the position of the sensor element (pixel) on the detector 6. Here, $c_x$ and $c_y$ are the coordinates at which the optical axis intersects the detector, $v_c$ is the measured relative band position at this position and $f_{\text{eff}}$ is the effective focal length of the microscope optics.

$$v_{xy} = v_c \cdot \cos a = v_c \cdot \cos\left(\arctan\left(\frac{\sqrt{(c_y-y)^2+(c_x-x)^2}}{f_{\text{eff}}}\right)\right) \quad (4)$$

The following correcting quantity arises:

$$k = \frac{v_{xy}}{v_L} = \frac{v_c \cos\left(\arctan\left(\frac{\sqrt{(c_y-y)^2+(c_x-x)^2}}{f_{\text{eff}}}\right)\right)}{v_L}$$

$$k_F(x,y) = k_c \cos\left(\arctan\left(\frac{\sqrt{(c_y-y)^2+(c_x-x)^2}}{f_{\text{eff}}}\right)\right)$$

The following applies to small angles: arctan x≈x and cos x≈1−x²/2. Thus, it is necessary to find a quadratic function of the form $$k(x,y) = \frac{v_c}{v_L} \cdot (1 - a \cdot ((c_y-y)^2 + (c_x-x)^2)) =$$
$$k_c \cdot (1 - a \cdot ((c_y-y)^2 + (c_x-x)^2))$$
$$= -k_c a \cdot x^2 + 2k_c a c_x \cdot x - k_c a \cdot y^2 +$$
$$2k_c a c_y \cdot y + k_c - k_c a c_y^2 - k_c a c_x^2$$

$$k(x,y) = a' \cdot (x^2 + y^2) + b' \cdot x + c' \cdot y + d'$$

which the measurement data describe to the best possible extent. It is possible to set up an equation of the aforementioned type for each of the n pixels with the coordinates (x, y)$_n$ and the correcting quantity $k_n$. All n equations can then be represented in matrix form:

$$A \cdot \vec{x} = \vec{k} \cdot \begin{pmatrix} x_1^2+y_1^2 & x_1 & y_1 & 1 \\ x_2^2+y_2^2 & x_2 & y_2 & 1 \\ \vdots & \vdots & \vdots & \vdots \\ x_n^2+y_n^2 & x_n & y_n & 1 \end{pmatrix} \cdot \begin{pmatrix} a' \\ b' \\ c' \\ d' \end{pmatrix} = \begin{pmatrix} k_1 \\ k_2 \\ \vdots \\ k_n \end{pmatrix}$$

This system of equations has n equations (e.g., 32×32) and four unknowns. Thus, it is overdetermined. The best optimized solution (least-squares fit) is:

$$\begin{pmatrix} a' \\ b' \\ c' \\ d' \end{pmatrix} = (A^T \cdot A)^{-1} \cdot A^T \cdot \begin{pmatrix} k_1 \\ k_2 \\ \vdots \\ k_n \end{pmatrix}$$

Thus, to obtain a solution, all that is needed is knowledge about matrix multiplication, the formation of a transposed matrix and the formation of an inverse matrix. By way of example, the inverse matrix can be formed using Cramer's rule with determinants. From the results a', b', c', d', it is possible to calculate the desired parameters $c_x$, $c_y$, $k_c$, and a.

$$c_x = -\frac{b'}{2a'}$$

$$c_y = -\frac{d'}{2a'}$$

$$k_c = d' - a' \cdot c_y^2 - a' \cdot c_y^2$$

$$a = -\frac{a'}{k_c}$$

Figure 6:
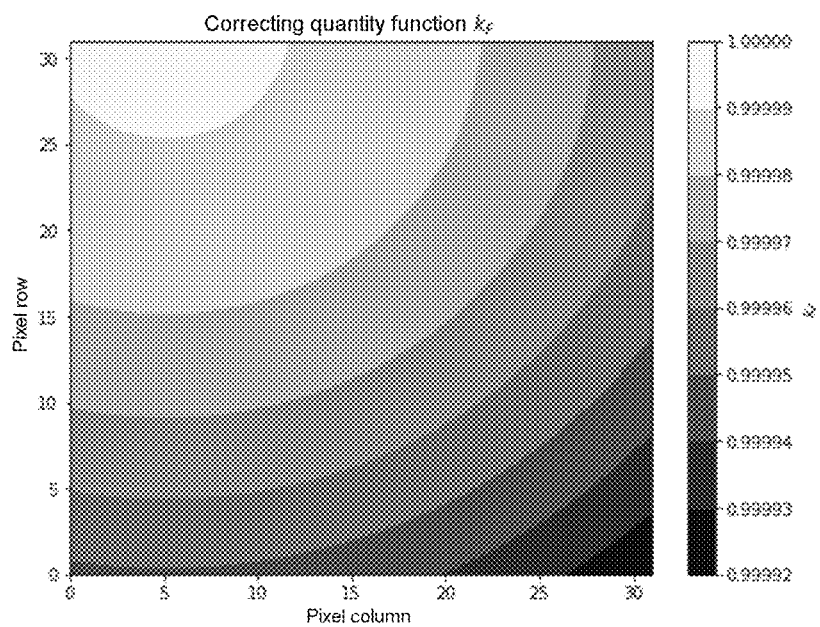
FIG. 6 shows, in spatially resolved fashion, a correcting quantity function $k_F(x,y)$ which was determined in step d) with the aid of the correcting quantities $k_{xy}$ calculated in step c) and an analytical model for the various sensor element positions (x,y) of the detector.
Figure 8:
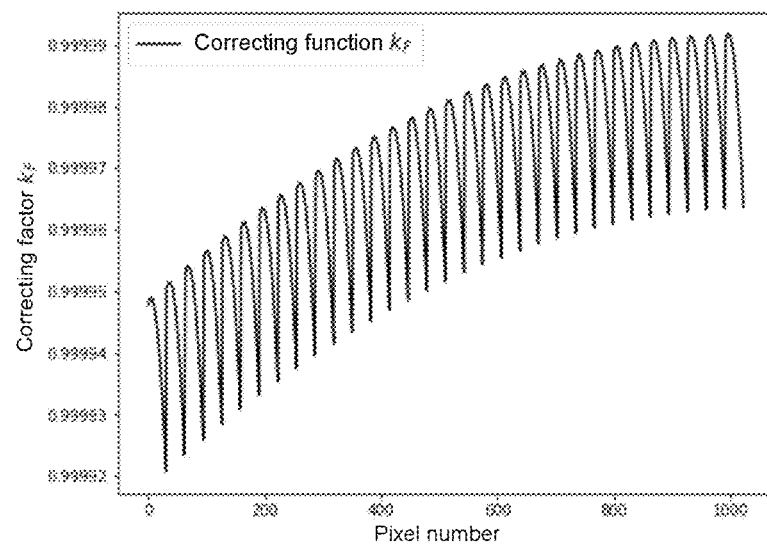
FIG. 8 shows the curve of the correcting quantity function $k_F(x,y)$ of FIG. 7 as a function of the pixel number of the IR detector.

FIGS. 6 and 8 show, by way of example, the correcting quantity function $k_F(x,y)$, calculated via the above-described model, for a peak position P of a reference absorption peak at $v_L=1576.130$ cm$^{-1}$. Solving the system of equations arising from the analytical model yields:

$$c_x = 5.12346$$

$$c_y = 31.9599$$

$$k_c = 0.9999918157$$

$$a = 4.20110015E-8$$

This yields a noise-free correcting quantity function $k_F(x,y)$.

Figure 7:
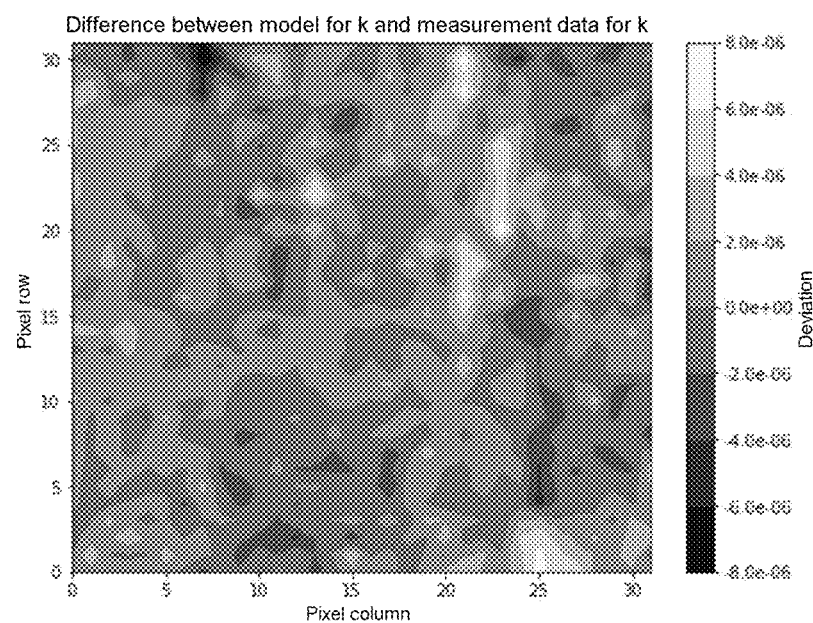
FIG. 7 shows, in spatially resolved fashion, the difference between the correcting quantity function $k_F(x,y)$ of FIG. 6 and the correcting quantities $k_{xy}$, calculated in step c), of FIG. 5 for the various sensor element positions (x,y) of the detector.

The difference between the correcting quantity function $k_F(x,y)$ calculated with the analytical model and the correcting quantities $k_{xy}$ calculated from the measured data is illustrated in FIG. 7.

Figure 10:
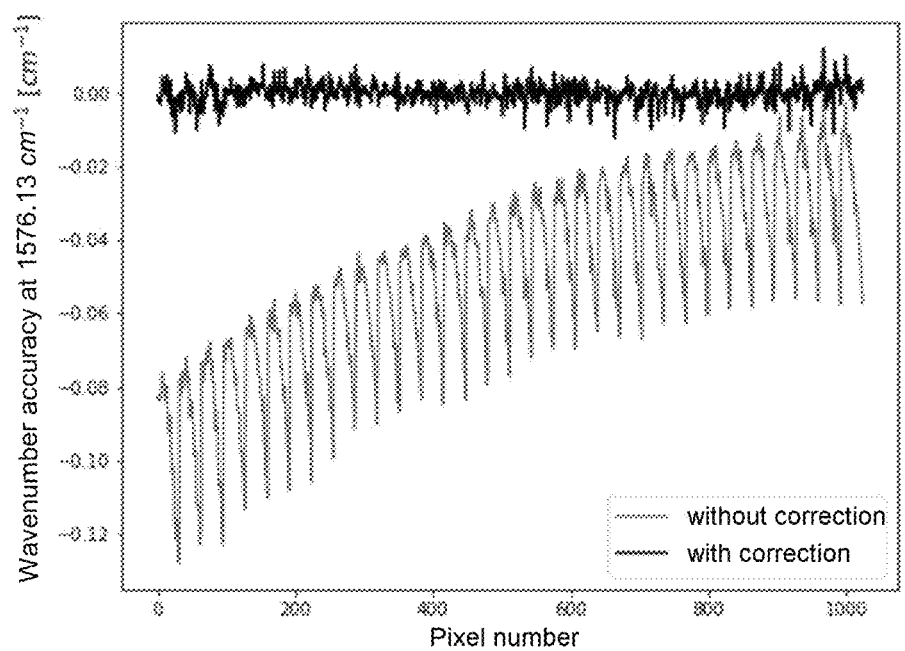
FIG. 10 shows a diagram which represents the wavenumber accuracy of the selected absorption peak as a function of the pixel number of the IR detector, both with and without correction.

FIG. 10 shows a comparison of the wavenumber accuracy or frequency accuracy for a measurement using an imaging FTIR microscope at 1576.130 cm$^{-1}$ without frequency correction and with the described frequency correction. FIG. 10 plots the deviation of the relative band position from the literature value (1576.130 cm$^{-1}$) as a function of the pixel number (number of the sensor element). It is quite evident that the wavenumber accuracy with the correction is an order of magnitude better than without correction.

Figure 11:
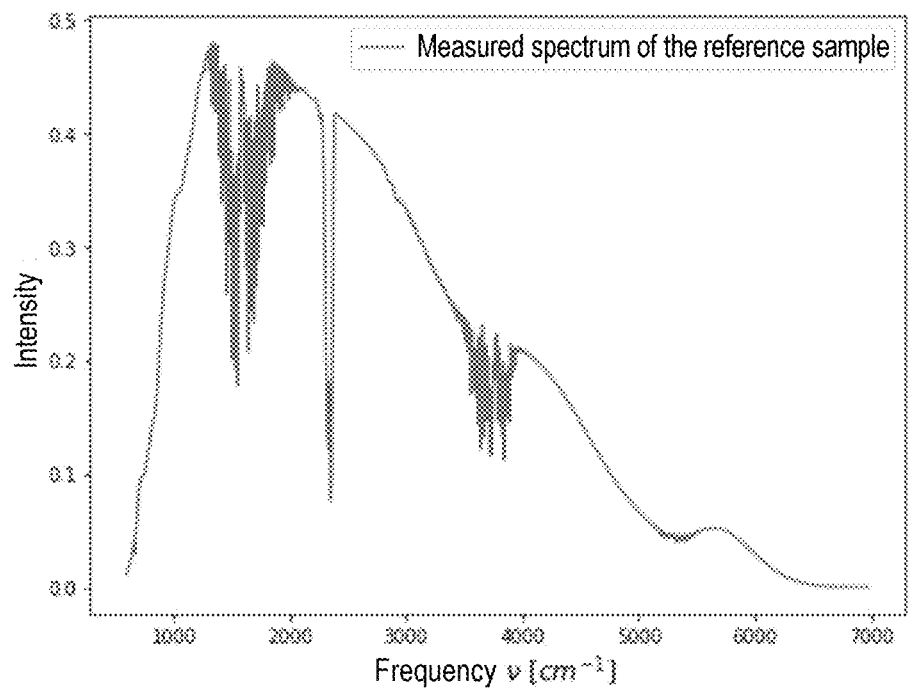
FIG. 11 shows a spectrum of a reference sample (air with water vapor and $CO_2$) measured with a sensor element.
Figure 12:
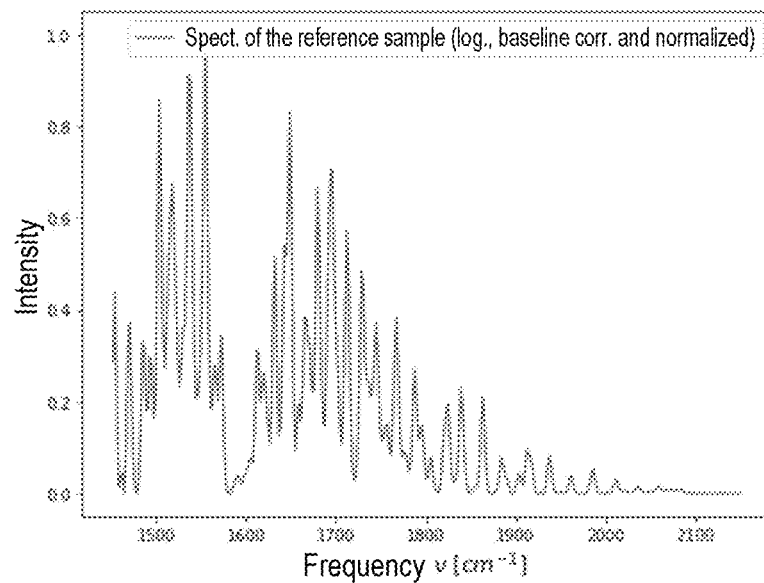
FIG. 12 shows a portion (absorption lines of water vapor) of the spectrum $R_{xy}(v)$ illustrated in FIG. 11 following a logarithmization, baseline correction and normalization.

Variant 2: Determining the Correcting Quantity Function Using a Selected Region of a Spectrum Instead of using a selected peak for the purposes of calculating the correcting quantity function, it is also possible to use the complete spectra or a selected frequency range of the spectra of the reference sample measured by the individual sensor elements. Such a spectrum is shown in FIG. 11 for a reference sample of air with water vapor and $CO_2$. FIG. 12 shows a portion of the spectrum illustrated in FIG. 11, specifically absorption lines of water vapor. The spectrum shown in FIG. 12 was subject to logarithmization, baseline correction and normalization, with it also being possible to dispense with normalization in principle.

Figure 13:
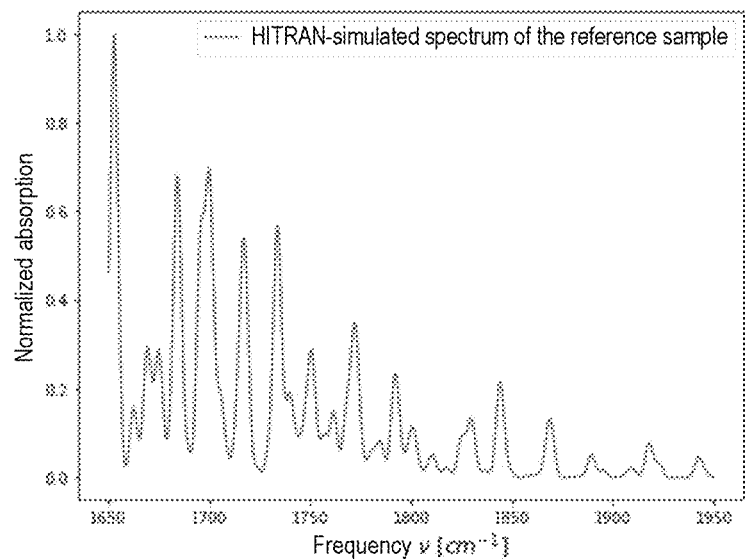
FIG. 13 shows a simulated absorption spectrum $S_{sim}(v)$ for water vapor.
Figure 14:
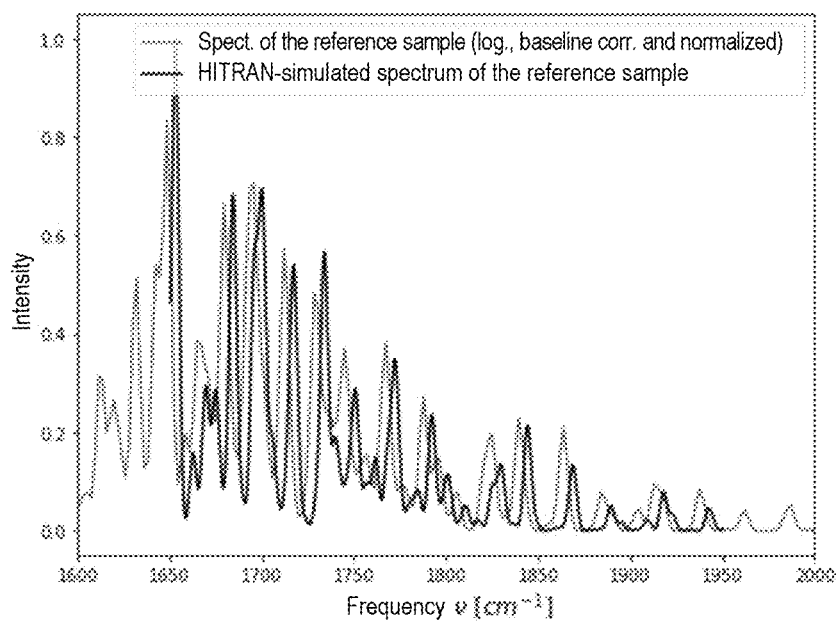
FIG. 14 shows a diagram in which the spectra $R_{xy}(v)$ and $S_{sim}(v)$ of FIGS. 12 and 13 are plotted together.

A simulated absorption spectrum for water vapor as shown in FIG. 13 is used as a reference data set for determining the correcting quantities $k_{xy}$. The simulated spectrum shown in FIG. 13 was simulated with the aid of HITRAN (high-resolution transmission molecular absorption database). In FIG. 14, the two spectra (the selected portion of the measured spectrum and the simulated spectrum) are plotted together for comparison purposes. It is evident that the spectra are shifted in relation to one another.

There now is an iterative correction of the frequency axis of the measured spectrum by virtue of each frequency value $v_n$ of a spectral point $(v_n, I_n)$ being divided by a correcting quantity $k_{xy}$ of the sensor element at the position (x,y) such that the spectral point is altered to $(v_n/k_{xy}, I_n)$.

Figure 15:
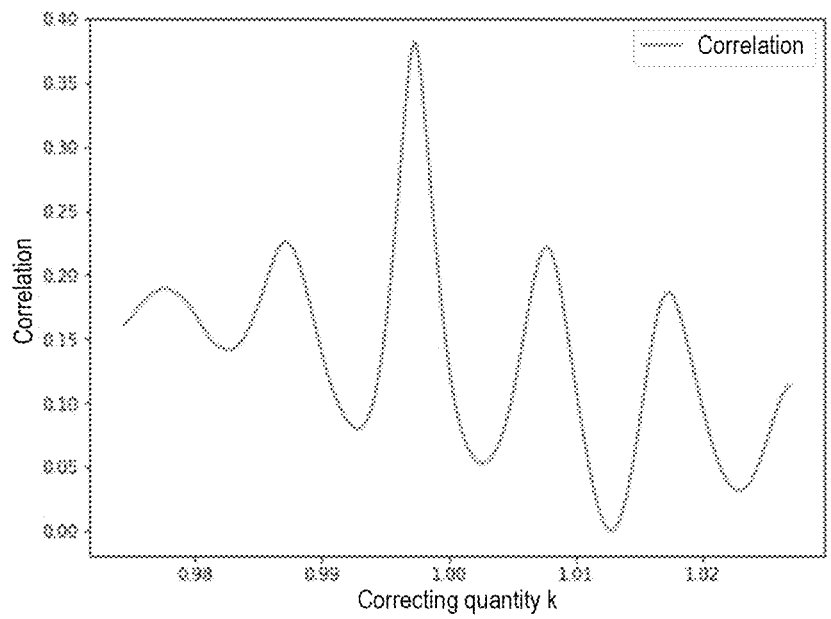
FIG. 15 shows the correlation of the spectrum $R_{xy}(v/v_L)$ of FIG. 12, modified by a correcting quantity $k_{xy}$, with the simulated spectrum $S_{sim}(v)$ of FIG. 13 as a function of the correcting quantity $k_{xy}$.

To this end, there is an iterative variation of the correcting quantity $k_{xy}$ and correlations of the spectra modified by $k_{xy}$ with the simulated spectrum are calculated for each sensor element. FIG. 15 shows the corresponding correlation of the spectra shown in FIG. 14, as a function of the correcting quantity $k_{xy}$. In the example shown, a maximum correlation arises for $k_{xy}=0.9973099$.

Figure 16:
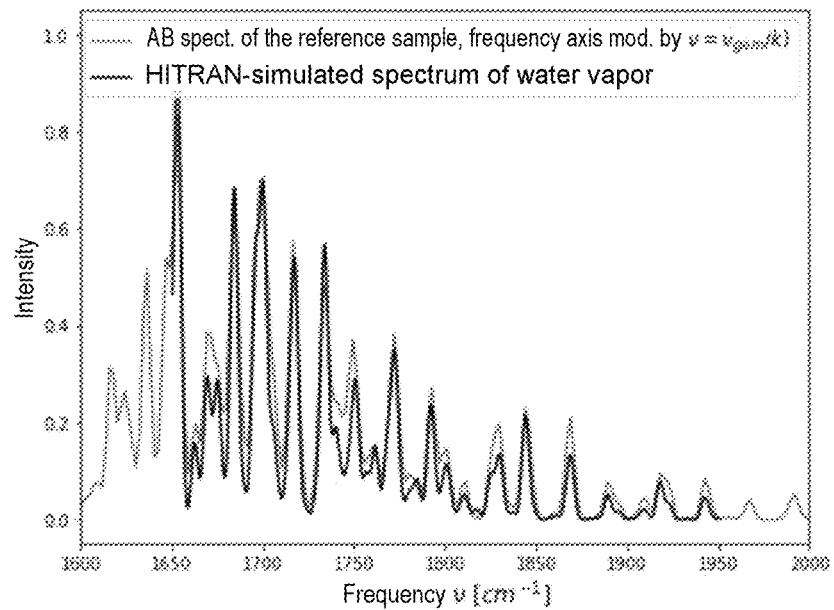
FIG. 16 shows the comparison of the simulated spectrum $S_{sim}(v)$ with the measured spectrum modified with $k_{xy}=0.9973099$.

FIG. 16 shows the comparison of the simulated spectrum with the measured spectrum modified by the determined correction value $k_{xy}=0.9973099$. It is evident that (in contrast to FIG. 14) the peaks of the simulated spectrum coincide with the peaks of the corrected measured spectrum.

Figure 17:
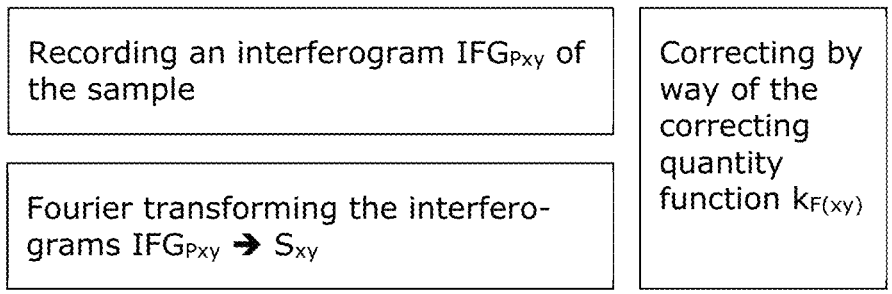
FIG. 17 shows the basic method steps of the method according to the invention for generating a frequency-corrected hyperspectral image.

According to the invention, the correcting quantity function determined is used to correct the spectra of a sample measured by various sensor elements of an IR detector of an FTIR measurement arrangement in order to obtain a frequency-corrected hyperspectral image of the sample (FIG. 17). To determine a hyperspectral image, an interferogram $IFG_{P_{xy}}$ with an equidistant sampling grid $a_{xy}$ is initially recorded with the sensor element for each sensor element of the IR detector. By Fourier transforming the interferogram $IFG_P xy$, a spectrum $S_{xy}(v)$ with a frequency axis is determined. According to the invention, the spectrum $S_{xy}(v)$ of each sensor element is corrected by a correcting quantity function $k_F(x,y)$.

Figure 18:
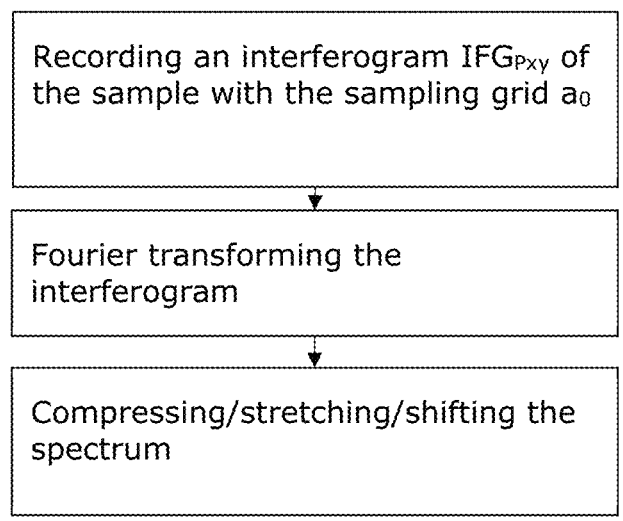
FIG. 18 shows the method steps of variants I and II of the method according to the invention for generating a frequency-corrected hyperspectral image.
Figure 19:
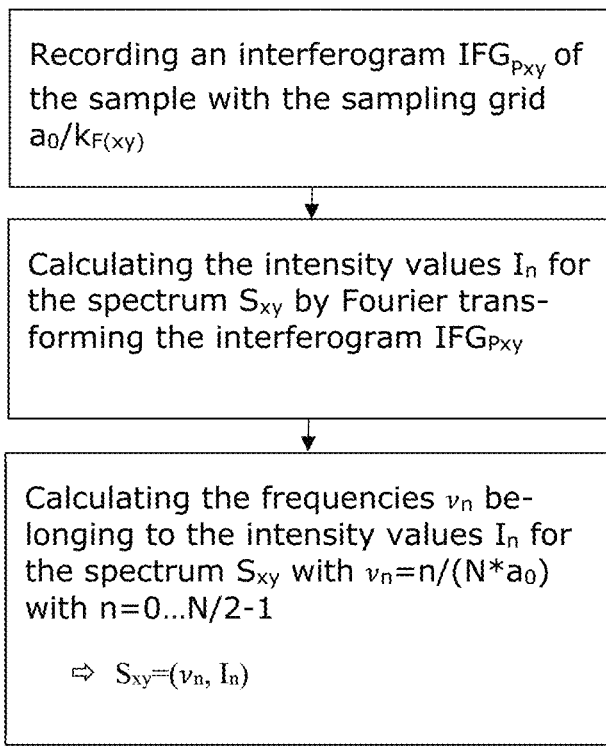
FIG. 19 shows the method steps of a variant III of the method according to the invention for generating a frequency-corrected hyperspectral image.
Figure 20:
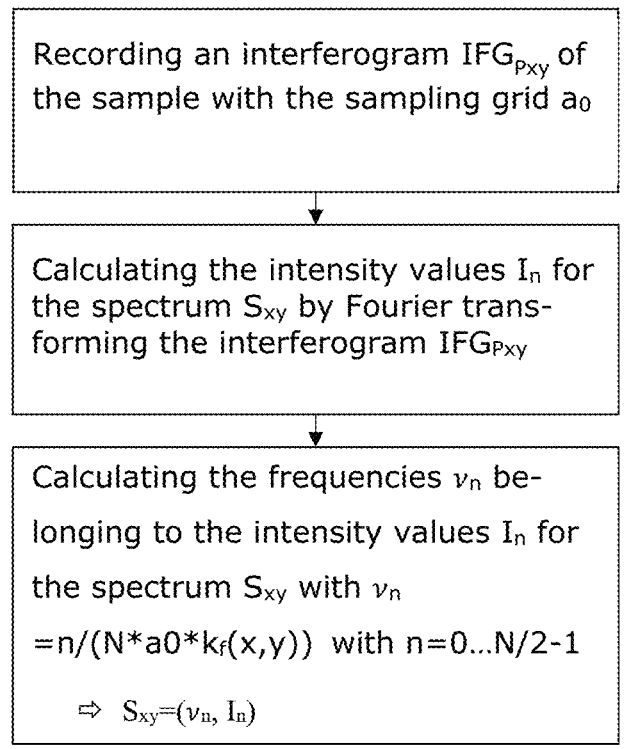
FIG. 20 shows the method steps of a variant IV of the method according to the invention for generating a frequency-corrected hyperspectral image.

In this case, the correction can be implemented in the calculated spectrum, i.e., after the Fourier transform (variants I and II, illustrated in FIG. 18), or during the recording and the subsequent Fourier transform (variant III, illustrated in FIG. 19, and variant IV, illustrated in FIG. 20):

The individual spectra of each sensor element can be corrected in the frequency axis by virtue of the frequency axis of each spectrum being stretched by the corresponding correcting quantity, i.e., each frequency or wavenumber is multiplied by an appropriate factor (variant I). This initially ensures that the frequency grid in the spectra of the individual sensor elements is no longer the same. However, the spectra can be returned to the same frequency grid by a possible interpolation.

In variant II, the spectra are shifted in relation to the frequency axis by the corresponding correcting quantity $k_{xy}$.

In variant III, the correcting quantities $k_{xy}$ are already taken into account when recording the interferograms by virtue of the interferograms being sampled with a grid $a_{xy}=a_0/k_F(x, y)$ that has been stretched in relation to the sampling grid $a_0$ theoretically required for the measurement with a sensor element situated on the optical axis for those sensor elements where a compression of the frequency axis is expected. By way of a Fourier transform, the intensity values $I_n$ of the spectra $S_{xy}$ are calculated. Subsequently, the associated frequencies are determined for the calculated intensity values $I_n$: $v_n=n/(N*a_0)$. Here, $a_0$ is used as a value for the sampling grid. This procedure ensures that the spectra of all sensor elements are frequency-corrected and also have the same frequency grid. The equidistant frequency grid with $\Delta v=1/(N*a_0)$ extends over a range of 0 to $(N/2-1)*\Delta v$ for all spectra. Here, N denotes the number of recorded points in each interferogram [4].

In the variant IV, the interferograms are recorded with the sampling grid $a_0$. The correction is implemented by virtue of the frequency axis being calculated on an individual basis for each spectrum $S_{xy}$ such that an equidistant frequency grid arises for each spectrum from 0 to $(N/2-1)*\Delta v_{xy}$, with $\Delta v_{xy}=1/(N*a_0*k_F(x, y))$.

In all variants, a hyperspectral image is obtained, in which the influence of the positioning of the various sensor elements in relation to the optical axis of the FTIR measurement arrangement is taken into account.

CITATIONS

[1] Robert John Bell,
Introductory Fourier Transform Spectroscopy,
Academic Press, 1972
[2] E. V. Lowenstein
Fourier Spectroscopy: An Introduction, Aspen Int. Conf. on Fourier Spectroscopy,
1970, p. 3, AFCRL-71-0019, 5 Jan. 1971, Spec. Rep. No. 114

[3] Peter R. Griffith, James A. de Haseth
  Fourier transform infrared Spectrometry
  Vol. 83 in Chemical Analysis
  pp. 32-39,
[4] Werner Herres and Joern Gronzolz, Understanding FTIR Data Processing

LIST OF REFERENCE SIGNS

1 IR source
2 Mirror
3 Interferometer
3a Beam splitter
3b, 3c Mirror
4 Microscope optics
4a Mirror
4b Half-mirror
5 Sample position
6 IR detector
7 Sensor elements of the IR detector
Expressions
  (x,y) Position of a sensor element of the IR detector
  $k_{xy}$ Correcting quantity for the sensor element at the position (x,y)
  $k_F(x, y)$ Correcting quantity function
  $v_{xy}$ Actual position of a selected absorption peak P in the spectrum
  $v_L$ Target position of a selected absorption peak P in the spectrum
  $R_{xy}$ Spectrum of the reference sample, measured by the sensor element at the position (x,y)
  $S_{sim}$ Simulated spectrum of the reference sample
  $S_{xy}(v)$ Spectrum of the sample, measured by the sensor element at the position (x,y)
  $IFG_{Pxy}$ Interferogram of the sample with an equidistant sampling grid $a_{xy}$, measured by the sensor element at the position (x,y)
  $a_{xy}$ Sampling grid for measuring the interferogram of the sample with the sensor element at the position (x,y)
  $a_0$ Base sampling grid; preferably chosen such that the entire spectrum is located in the spectral range from 0 to $v_{max}$ for axiparallel beams
  $v_{max}$ Maximum frequency which can be recorded with a certain sampling grid $$v_{max} = \frac{N}{2}\Delta v = \frac{1}{2a}$$

$(v_n, I_n)$ Spectral point within a spectrum $S_{xy}(v)$ of the sample
  $I_n$ Intensity of the n-th spectral point in the spectrum $S_{xy}(v)$ of the sample (at the frequency position $v_n$)
  N Number of recorded points in the interferogram

What is claimed is:

1. A method for generating a frequency-corrected hyperspectral image of a sample with a Fourier Transform infrared (FTIR) measurement arrangement including an infrared detector having a plurality of sensor elements, the method comprising, for each of the plurality of sensor elements which are respectively located at a position (x,y) of the IR detector:
  recording an interferogram $IFG_{Pxy}$ with an equidistant sampling grid $a_{xy}$ with the sensor element;
  Fourier transforming the interferogram $IFG_{Pxy}$ to determine a spectrum $S_{xy}(v)$ with a frequency axis;
  wherein the spectrum $S_{xy}(v)$ for each of the plurality of sensor elements is corrected with a correcting quantity function $k_F(x,y)$ for calibrating the FTIR measurement arrangement with the IR detector,
  wherein the correcting quantity function $k_F(x,y)$ is determined with a method which comprises:
  a) recording interferograms $IFG_{Rxy}$ of a reference sample with the plurality of sensor elements of the IR detector;
  b) calculating spectra R of the reference sample by Fourier transforming the interferograms $IFG_{Rxy}$ of the reference sample for at least four sensor elements;
  c) calculating correcting quantities $k_{xy}$ by comparing each spectrum of the spectra $R_{xy}$ of the reference sample calculated in said step b) with a reference data set of the reference sample, wherein the reference data set comprises a target position $v_1$ of a selected absorption peak P of the reference sample;
  d) determining the correcting quantity function $k_F(x, y)$ based on the correcting quantities $k_{xy}$ calculated in said step c),
    wherein the correcting quantity function $k_F(x,y)$ is determined by stretching or compressing the spectra $R_{xy}$ of the reference sample calculated in said step b), or by dividing the target position $v_L$ and an actual position $v_{xy}$, wherein the interferogram $IFG_{Pxy}$ is recorded with the equidistant sampling grid $a_{xy}=a_0/k_F(x, y)$ and wherein spectra of the sample are subsequently generated by a Fourier transform of corrected interferograms, where $a_0$ provides a value for the equidistant sampling grid $a_{xy}$ when calculating values for the frequency axis.

2. The method as claimed in claim 1, wherein the reference data set comprises a simulated spectrum $S_{sim}$ with a plurality of absorption peaks of the reference sample and said calculating of the correcting quantities $k_{xy}$ in said step c) is implemented by comparing the spectra $R_{xy}$ of the reference sample calculated in said step b) with the simulated spectrum $S_{sim}$.

3. The method as claimed in claim 2, wherein the correcting quantities $k_{xy}$ are determined by maximizing a correlation, by varying the correcting quantities $k_{xy}$ between the simulated spectrum $S_{sim}(v)$ and the spectra $R_{xy}(v/k_{xy})$ stretched or compressed by $1/k_{xy}$.

4. The method as claimed in claim 1, wherein the correcting quantity function $k_F(x,y)$ is given by $$k_F(x, y) = k_c \cos\left(\arctan\left(\frac{\sqrt{(c_y - y)^2 + (c_x - x)^2}}{f_{eff}}\right)\right)$$

where $c_y$, $c_x$, $f_{eff}$ and $k_c$ are parameters for matching the correcting quantity function $k_F(x,y)$ to the calculated correcting quantities $k_{xy}$.

5. The method as claimed in claim 4, wherein the correcting quantity function $k_F(x,y)$ is matched to the calculated correcting quantities $k_{xy}$ by minimizing an error function:

$$\Sigma_{xy}(k_F(x,y)-k_{xy})^2.$$

6. The method as claimed in claim 4, wherein the parameters required for the matching are determined by setting up equations with the correcting quantities $k_{xy}$ calculated in said step c) for the at least four sensor elements to produce a system of equations and by solving the system of equations through curve fitting.

7. The method as claimed in claim 1, wherein the correcting quantity function $k_F(x,y)$ is given by $$k_F(x,y)=a*(x^2+y^2)+b*x+c*y+d$$

where a, b, c and d are parameters for matching the correcting quantity function $k_F(x,y)$ to the calculated correcting quantities $k_{xy}$.

8. The method as claimed in claim 7, wherein the correcting quantity function $k_F(x,y)$ is matched to the calculated correcting quantities $k_{xy}$ by minimizing an error function:

$$\Sigma_{xy}(k_F(x,y)-k_{xy})^2.$$

9. The method as claimed in claim 7, wherein the parameters required for the matching are determined by setting up equations with the correcting quantities $k_{xy}$ calculated in said step c) for the at least four sensor elements to produce a system of equations and by solving the system of equations through curve fitting.

10. A method for generating a frequency-corrected hyperspectral image of a sample with a Fourier Transform infrared (FTIR) measurement arrangement including an infrared detector having a plurality of sensor elements, the method comprising, for each of the plurality of sensor elements which are respectively located at a position (x,y) of the IR detector:

recording an interferogram $IFG_{Pxy}$ with an equidistant sampling grid $a_{xy}$ with the sensor element;

Fourier transforming the interferogram $IFG_{Pxy}$, to determine a spectrum $S_{xy}(v)$ with a frequency axis;

wherein the spectrum $S_{xy}(v)$ for each of the plurality of sensor elements is corrected with a correcting quantity function $k_F(x,y)$ for calibrating the FTIR measurement arrangement with the IR detector, wherein the correcting quantity function $k_F(x,y)$ is determined with a method which comprises:

a) recording interferograms $IFG_{Rxy}$ of a reference sample with the plurality of sensor elements of the IR detector;

b) calculating spectra $R_{xy}$ of the reference sample by Fourier transforming the interferograms $IFG_{Rxy}$ of the reference sample for at least four sensor elements;

c) calculating correcting quantities $k_{xy}$ by comparing each spectrum of the spectra $R_{xy}$ of the reference sample calculated in said step b) with a reference data set of the reference sample, wherein the reference data set comprises a target position $v_1$ of a selected absorption peak P of the reference sample;

d) determining the correcting quantity function $k_F(x, y)$ based on the correcting quantities $k_{xy}$ calculated in said step c), wherein the correcting quantity function $k_F(x,y)$ is determined by stretching or compressing the spectra $R_{xy}$ of the reference sample calculated in said step b), or by dividing the target position $v_L$ and an actual position $v_{xy}$, wherein the interferogram $IFG_{Pxy}$ is recorded with the equidistant sampling grid $a_{xy}=a_0$ and wherein spectra of the sample are subsequently generated by a Fourier transform of interferograms, where $a_0*k_F(x,y)$ provides a value for the equidistant sampling grid $a_{xy}$ when calculating values for the frequency axis.

11. The method as claimed in claim 10, wherein the reference data set comprises a simulated spectrum $S_{sim}$ with a plurality of absorption peaks of the reference sample and said calculating of the correcting quantities $k_{xy}$ in said step c) is implemented by comparing the spectra $R_{xy}$ of the reference sample calculated in said step b) with the simulated spectrum $S_{sim}$.

12. The method as claimed in claim 10, wherein the correcting quantities $k_{xy}$ are determined by maximizing a correlation, by varying the correcting quantities $k_{xy}$, between the simulated spectrum $S_{sim}(v)$ and the spectra $R_{xy}(v/k_{xy})$ stretched or compressed by $1/k_{xy}$.

13. The method as claimed in claim 10, wherein the correcting quantity function $k_F(x,y)$ is given by $$k_F(x, y) = k_c \cos\left(\arctan\left(\frac{\sqrt{(c_y - y)^2 + (c_x - x)^2}}{f_{eff}}\right)\right)$$

where $c_y$, $c_x$, $f_{eff}$ and $k_c$ are parameters for matching the correcting quantity function $k_F(x,y)$ to the calculated correcting quantities $k_{xy}$.

14. The method as claimed in claim 13, wherein the correcting quantity function $k_F(x,y)$ is matched to the calculated correcting quantities $k_{xy}$ by minimizing an error function:

$$\Sigma_{xy}(k_F(x,y)-k_{xy})^2.$$

15. The method as claimed in claim 13, wherein the parameters required for the matching are determined by setting up equations with the correcting quantities $k_{xy}$ calculated in said step c) for the at least four sensor elements to produce a system of equations and by solving the system of equations through curve fitting.

16. The method as claimed in claim 10, wherein the correcting quantity function $k_F(x,y)$ is given by $$k_F(x,y)=a*(x^2+y^2)+b*x+c*y+d$$

where a, b, c and d are parameters for matching the correcting quantity function $k_F(x,y)$ to the calculated correcting quantities $k_{xy}$.

17. The method as claimed in claim 16, wherein the correcting quantity function $k_F(x,y)$ is matched to the calculated correcting quantities $k_{xy}$ by minimizing an error function:

$$\Sigma_{xy}(k_F(x,y)-k_{xy})^2.$$

18. The method as claimed in claim 16, wherein the parameters required for the matching are determined by setting up equations with the correcting quantities $k_{xy}$ calculated in said step c) for the at least four sensor elements to produce a system of equations and by solving the system of equations through curve fitting.

* * * * *